(12) United States Patent
Fishman et al.

(10) Patent No.: US 11,732,467 B2
(45) Date of Patent: Aug. 22, 2023

(54) ACOUSTIC TILE

(71) Applicant: Biomimicry Inventions, LLC, Denver, CO (US)

(72) Inventors: Cynthia Fishman, Denver, CO (US); Scott Bailey, Denver, CO (US)

(73) Assignee: BIOMIMICRY INVENTIONS, LLC, Denver, CO (US)

(*) Notice: Subject to any disclaimer, the term of this patent is extended or adjusted under 35 U.S.C. 154(b) by 484 days.

(21) Appl. No.: 15/929,933

(22) Filed: May 29, 2020

(65) Prior Publication Data
US 2020/0378111 A1  Dec. 3, 2020

Related U.S. Application Data

(60) Provisional application No. 62/854,404, filed on May 30, 2019.

(51) Int. Cl.
| | | |
|---|---|---|
| *B32B 3/10* | (2006.01) | |
| *E04B 1/84* | (2006.01) | |
| *E04B 9/00* | (2006.01) | |
| *B32B 3/26* | (2006.01) | |
| *G10K 11/172* | (2006.01) | |

(52) U.S. Cl.
CPC .............. *E04B 1/84* (2013.01); *B32B 3/266* (2013.01); *E04B 9/001* (2013.01); *G10K 11/172* (2013.01); *B32B 2250/02* (2013.01); *B32B 2307/102* (2013.01); *B32B 2307/732* (2013.01); *B32B 2419/04* (2013.01); *B32B 2419/06* (2013.01); *E04B 2001/848* (2013.01); *E04B 2001/8461* (2013.01)

(58) Field of Classification Search
CPC ................................ B32B 3/2266; E04B 1/84
See application file for complete search history.

(56) References Cited

U.S. PATENT DOCUMENTS

| | | | |
|---|---|---|---|
| 4,113,053 A * | 9/1978 | Matsumoto ........... | E01F 8/0076 181/284 |
| 4,207,964 A * | 6/1980 | Taguchi .................... | E04B 1/99 428/33 |
| 10,621,966 B2 | 4/2020 | Kim et al. | |
| 2003/0006091 A1 | 1/2003 | Golterman | |
| 2008/0128201 A1 | 6/2008 | Yamaguchi et al. | |
| 2008/0236097 A1 | 10/2008 | Tinianov | |
| 2011/0147115 A1 | 6/2011 | Ertl | |

(Continued)

OTHER PUBLICATIONS https:/www.stylus.com/Thebrief—Acoustic Panels Made with Bio-material and Biomimicry, 2 pages.

(Continued)

*Primary Examiner* — Elizabeth E Mulvaney
(74) *Attorney, Agent, or Firm* — Trenner Law Firm, LLC; Mark D. Trenner

(57) ABSTRACT

An example acoustic tile is disclosed having a structure with at least one layer. A plurality of openings are formed in the at least one layer of the structure. The openings are configured to direct sound waves hitting the structure in multiple different directions through the at least one layer to absorb a majority of the sound waves and inhibit the sound waves hitting the structure from reflecting off of the structure. In an example, the openings are juxtaposed, different sizes, different orientations, and/or different numbers of openings on separate layers.

19 Claims, 4 Drawing Sheets

(56) References Cited

U.S. PATENT DOCUMENTS

2018/0245334 A1   8/2018   Udagawa et al.
2019/0392809 A1  12/2019   Von Fange et al.
2020/0027436 A1   1/2020   Shackleford et al.

OTHER PUBLICATIONS

Aziz, Moheb Sabry and Sherif, Amar Y. El, Alexandria Engineering Journal, Oct. 28, 2015, vol. 55, pp. 707-714, Alexandria University (2016).
https://dezeen.com, Box launches biodegradable acoustic panels made from a plant based material, 9 pages.
The Moth Making Waves in Sound Technology, European Union News, Jun. 8, 2019, 3 pages, Plus Media Solutions, United Kingdom.
Dave, Shivani, www.bbc.com/news/science-environment, Device could make underwater objects appear invisible to sonar, May 10, 2018, 3 pages.
Shen, Zhen, et al.,"Biomechanics of a moth scale at ultrasonic frequencies", Proceedings of the National Academy of Sciences of the United States of America, Nov. 27, 2018, pp. 1220-12205.

\* cited by examiner

ACOUSTIC TILE

PRIORITY CLAIM

This application claims the priority benefit of U.S. Provisional Patent Application No. 62/854,404 filed May 30, 2019 for "Acoustic Tile" of Cynthia Fishman and Scott Bailey, hereby incorporated by reference in its entirety as though fully set forth herein.

BACKGROUND

Room acoustics are particularly important in sound booths (e.g., for recording studios), doctor offices and hospitals, offices and other work spaces, homes and other living environments. Too much noise can cause distraction and a general feeling of unease, and in the case of hospitals, hinder recuperation time. There are other surfaces, such as on aquatic vessels, that prefer to evade detection for stealth or safety.

A noise absorbing material was sprayed on ceilings in the past, but this spray-on acoustic material came with a host of its own problems such as being difficult to clean and repaint.

Offices and other drop-ceiling environments often use ceiling tiles. The ceiling tiles are often flat panels and may have some texture. Although the texture may help reduce noise, it is mostly provided for aesthetics and does little to improve the acoustics.

DETAILED DESCRIPTION

Figure 1:
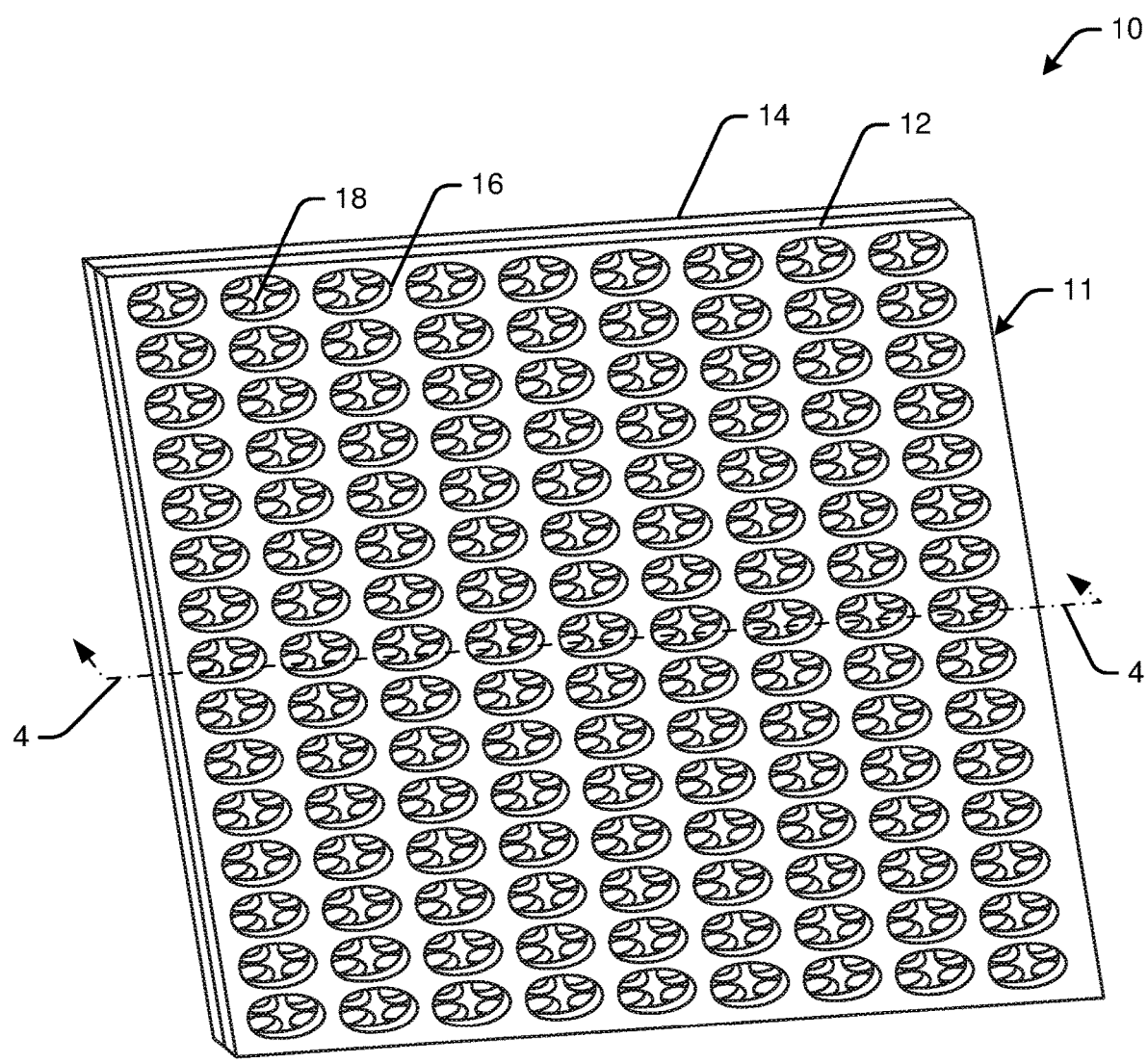
FIG. 1 is a front perspective view of an example acoustic tile.

Biomimicry is defined as the design and production of materials, structures, and systems that are modeled on biological entities and processes. By way of illustration, If we zoom in on the "fuzzy parts" of a cabbage tree emperor moth, we see overlapping, spiky scales. When we go farther, we see that there are actually multiple layers of each scale, each layer having hollow pores. So how does the structure function? As sound waves from a bat hit the moth, they bounce farther and farther inward, almost completely absorbing the sound, rendering the moth nearly or completely "invisible" to a bat. Acoustic environments can be improved by applying these principles of nature to physical structures. In an example, an acoustic tile is disclosed herein having a porous structure including overlapping layers that are similar in their sound-reducing capability to the wings of the cabbage tree emperor moth.

Specifically, physical mechanisms result in several tuned mechanical displacements (i.e. resonances) of the scale of a moth. These displacements dissipate incident energy resulting in acoustic absorption, as might be useful in products serving the architectural acoustics market.

The acoustic tile disclosed herein is based in part on a parameterized model that optimizes the dominant frequency range of absorption. The parameters of the model include, but are not limited to, the physical dimensions, mass, stiffness, and damping of the materials of manufacture; the losses at the structural interfaces; the number of layers of the material; the diameters of the apertures; and the orientation of the fields that are likely to excite the mechanical displacement.

The acoustic tile incorporates sound mitigation properties that are based on geometry (as opposed to material composition). In addition, the acoustic tile may be made with environmentally-friendly materials.

In an example, the acoustic tile may be customized based on the sound frequencies in the location where it will be installed. In addition, the acoustic tile may implement energy dissipation in specific resonant modes of mechanical deformation (at the moth scale structural level). The physical mechanisms exploited by the Invention are particularly relevant to built environments where acoustic absorption is desirable, but its use is often precluded due to non-sanitary conditions associated with porous surfaces. The acoustic tile may be tuned for absorption due to mechanical deformation and dissipation within the structure, independent of the flow resistivity associated with the pores.

The overlapping layers contain apertures of different diameters and locations (i.e. the holes are not aligned) in order to create an acoustic lattice. The structure is created out of a material that is either non-porous so it can be used in hospitals or out of a material that can be applied to other materials.

While disclosed herein as being a "tile," the acoustic structure may be provided in any suitable end-product, including but not limited to panels, rolls, sheets, coatings, and other structures. In addition, the acoustic tile may be made of any suitable materials including plastics, foams, fabrics, etc. The acoustic tile may be manufactured according to any suitable method, including but not limited to injection molding, and 3-D printing, and may be manufactured in layers and/or as a unitary construction.

Before continuing, it is noted that as used herein, the terms "includes" and "including" mean, but is not limited to, "includes" or "including" and "includes at least" or "including at least." The term "based on" means "based on" and "based at least in part on."

Figure 2:
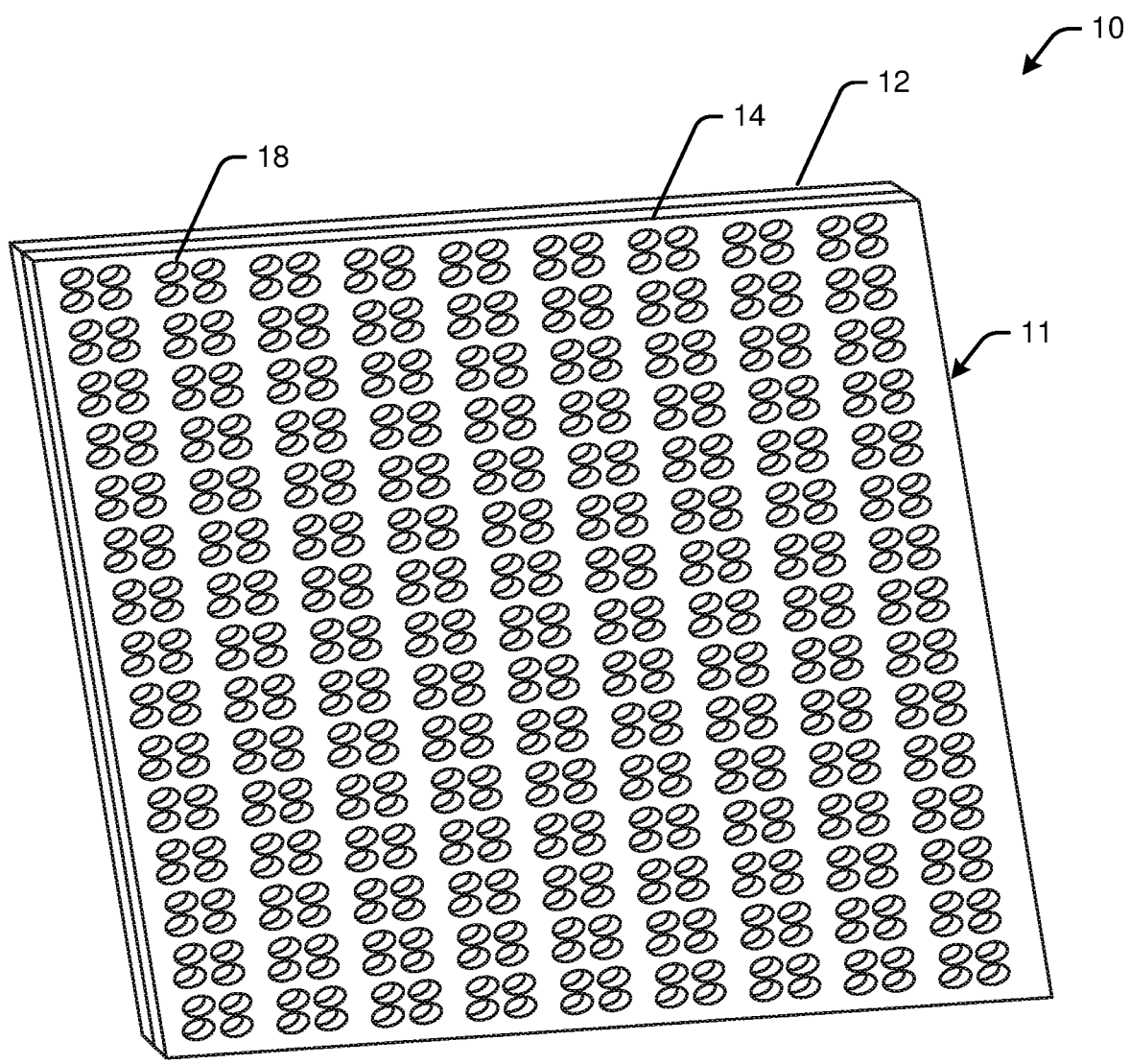
FIG. 2 is a back perspective view of the example acoustic tile.

FIG. 1 is a front perspective view of an example acoustic tile 10. FIG. 2 is a back perspective view of the example acoustic tile 10. The example acoustic tile 10 includes a structure 11 having one, two or more layers. In the example shown in FIGS. 1 and 2, there are two layers 12 and 14. Other examples may include only one layer (e.g., formed as a single unitary structure), or more than two layers, depending on various design considerations. Example design considerations include but are not limited to desired thickness of the acoustic tile 10 and its sound-absorbing properties.

The example acoustic tile 10 includes a plurality of pores or openings 16, 18. In the example shown, the openings 16 on the first layer 12 are juxtaposed relative to the openings 18 on the second layer 14. In addition, the openings 16 on the first layer 12 are a different size and orientation than the openings 18 on the second layer 14. Also in this example, there are more openings 18 on the second layer 14 than there are openings 16 on the first layer 12.

The openings 16, 18 may be configured in any suitable manner to direct sound waves therethrough, e.g., in multiple different directions to inhibit a direct "bounce" off of the structure 11. This configuration results in an acoustic tile which absorbs the sound waves in the acoustic tile itself.

It is noted that other configurations are also contemplated. The number, size, and/or shape of the openings 16, 18 may have different configurations than those shown based on design considerations (e.g., the material of the structure 11, desired sound-absorbing properties, etc.).

Figure 3:
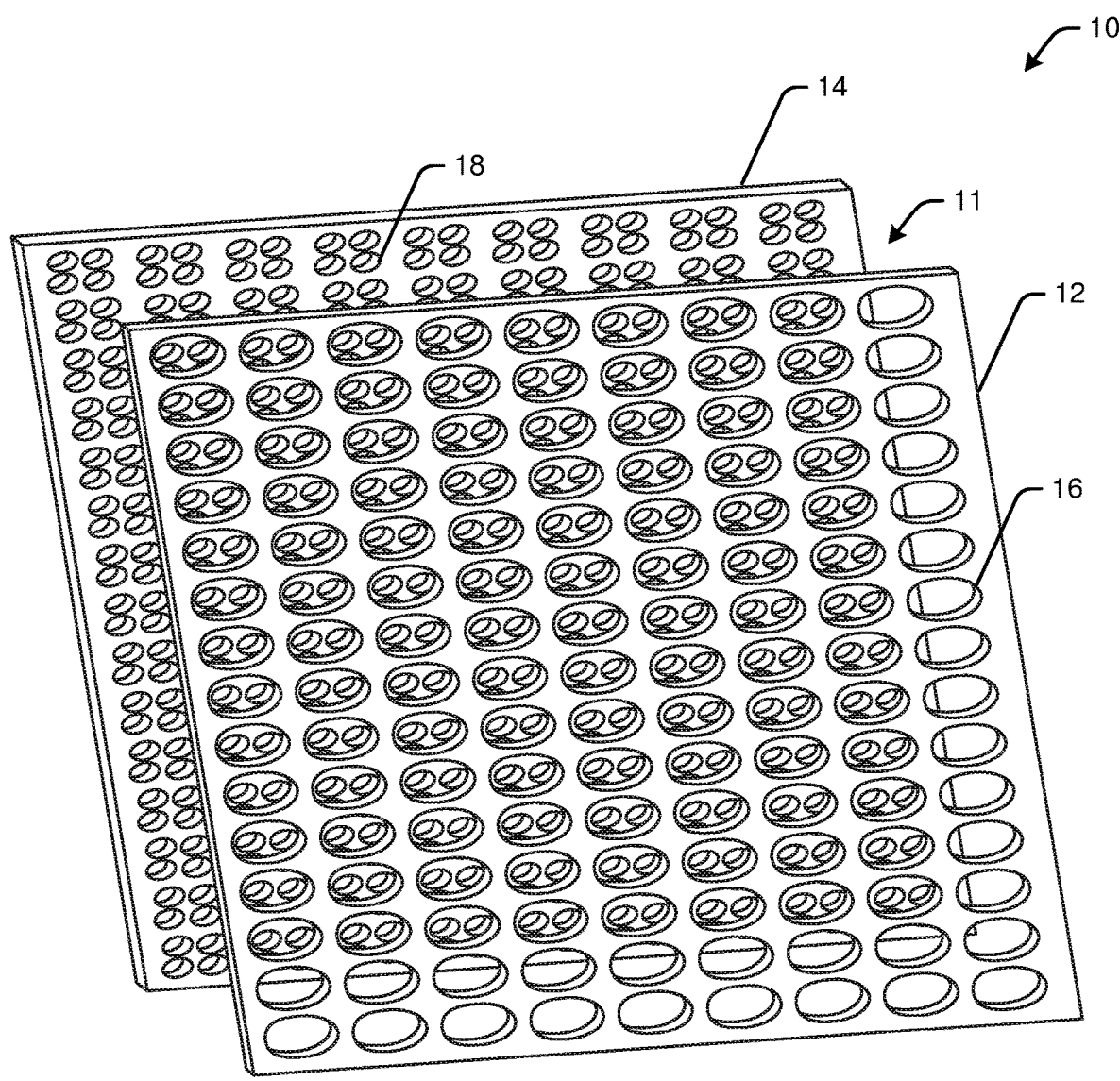
FIG. 3 is an exploded perspective view of the example acoustic tile.

FIG. 3 is an exploded perspective view of the example acoustic tile 10. As already discussed above, the example acoustic tile 10 has a structure with a first layer 12 and a second layer 14, and a plurality of openings 16, 18 formed through the layers 12, 14.

In an example, the configuration of the structure 11, including thickness and/or openings 16, 18, can be configured to direct sound waves hitting the structure in multiple different directions through the layers 12, 14 to absorb a majority of the sound waves. This inhibits the sound waves hitting the structure from reflecting off of the structure and increases the sound-deadening properties of the structure 11.

The layers 12, 14 have a thickness selected to increase sound-absorbing properties of the structure 11. Although two layers 12, 14 are shown in this example, the overall structure of the acoustic tile 10 may include one, two, or more layers, depending on design considerations. The number of layers of the structure 11 may be selected to increase sound-absorbing properties of the structure, and/or based on other design considerations.

In an example, the thickness of the structure 11 (e.g., the thickness of at least one layer 12, 14) and the number of openings are proportional to one another. That is, the thickness of at least one of the layers 12, 14 increases as the number of openings 16 and/or 18 decreases; and the thickness of at least one of the layers 12, 14 decreases as the number of openings 16 and/or 18 increases.

In addition, this illustration shows the "pores" or openings 16, 18 as various shaped oval openings. It can be seen in this example, that the openings are not perpendicular to the top/bottom surfaces, but rather are contorted to direct the sound waves therethrough in multiple different directions and inhibit a direct "bounce", thereby absorbing or "burying" the sound wave in the acoustic tile itself. This can be better seen in the cross-sectional views of FIGS. 4 and 5.

Figure 4:
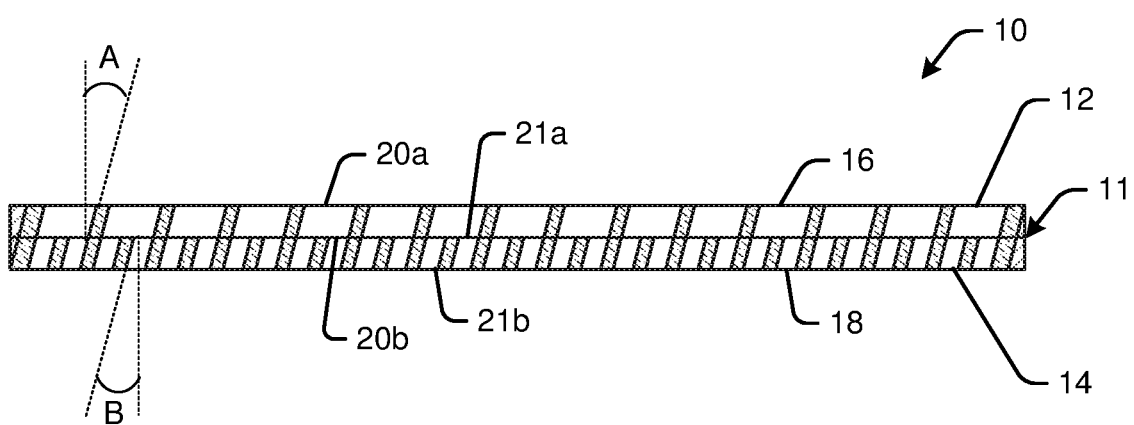
FIG. 4 is a cross sectional view of the example acoustic tile taken along lines 4-4 in FIG. 1.

FIG. 4 is a cross sectional view of the first layer 12 of the example acoustic tile 10 taken along lines 4-4 in FIG. 1. In an example, the plurality of openings 16, 18 are configured to increase sound-absorbing properties of the structure. For example, the number of the plurality of openings 16, 18 are selected to increase sound-absorbing properties of the structure. In an example, the openings are otherwise contorted to direct the sound waves therethrough in multiple different directions through the structure 11.

In an example, a plurality of the openings 16 on the first layer 12 are juxtaposed relative to a plurality of the openings 18 on the second layer 14. In an example, the plurality of the openings 16 on the first layer 12 are a different size than the plurality of the openings 18 on the second layer 14. In an example, the plurality of the openings 16 on the first layer 12 are a different orientation than the plurality of the openings 18 on the second layer 14.

Still other example configurations may include more of the plurality of the openings 16 on the first layer 12 than the number of openings 18 on the second layer 14, or vice versa. That is, another example configuration may include more of the plurality of the openings 18 on the second layer 18 than the plurality of the openings 16 on the first layer 12 (as illustrated in the drawings).

In an example, the plurality of openings 16 and/or 18 are various shaped ovals. However, other shapes are also contemplated, including a combination of different shapes. The number, size, orientation, and/or shape of the plurality of openings 16 and/or 18 may be based on any number of factors, including for example, material of manufacture of the structure 11 and/or the desired sound-absorbing properties of the structure 11.

In an example, at least some of the openings 16 that are formed between a top surface 20a and a bottom surface 20b of first layer 12 are not perpendicular to the top and bottom surfaces 20a, 20b. Likewise, at least some of the openings 18 that are formed between a top surface 21a and a bottom surface 21b of second layer 14 are not perpendicular to the top and bottom surfaces 21a, 21b. That is, these openings 16 and/or 18 are slanted or at an angle (e.g., angle A and/or angle B) relative to the surfaces 20a-b, 21a-b. In an example, the angle A and/or angle B may be reversed relative to the angle in the adjacent layer.

Before continuing, it should be noted that the examples described above are provided for purposes of illustration, and are not intended to be limiting. Other devices and/or device configurations may be utilized to carry out the operations described herein.

The operations shown and described herein are provided to illustrate example implementations. It is noted that the operations are not limited to the ordering shown. Still other operations may also be implemented.

During testing, computer-generated illustrations of sound reflection (e.g., noise) were studied for a room with a typical 12 inch by 12 inch hard gypsum ceiling based tile. This illustration showed a ray cast (e.g., sound waves) on the ceiling tile. Most of the sound waves were reflected (not absorbed) by the ceiling tile, bouncing off the walls and the floor. This can cause an unwelcome, noisy environment.

Computer-generated illustrations of sound reflection (e.g., noise) in a room with the example acoustic tile showed a ray cast (e.g., sound waves) on the example acoustic tile (e.g., of FIGS. 1 and 2). More of the sound waves were absorbed by the acoustic tile (e.g., reflected), so that there was a reduction in noise. That is, fewer sound waves were observed bouncing off the walls and returning toward the floor. This testing illustrated a largely improved acoustic tile that can improve the acoustics of a room.

It is noted that the examples shown and described are provided for purposes of illustration and are not intended to be limiting. Still other examples are also contemplated.

The invention claimed is:

1. An acoustic tile, comprising:
   a structure with at least a first layer and a second layer; and
   a first plurality of openings formed in the first layer of the structure;
   a second plurality of openings formed in the second layer of the structure, wherein the first plurality of openings is greater in number than the second plurality of openings;
   the first and second plurality of openings configured to direct sound waves hitting the structure in multiple different directions through the first layer and the second layer to absorb a majority of the sound waves and inhibit the sound waves hitting the structure from reflecting off of the structure to dampen sound.

2. The acoustic tile of claim 1, wherein the at least one layer has a thickness selected to increase sound-absorbing properties of the structure.

3. The acoustic tile of claim 1, wherein a number of layers of the structure is selected to increase sound-absorbing properties of the structure.

4. The acoustic tile of claim 1, wherein the plurality of openings are configured to increase sound-absorbing properties of the structure.

5. The acoustic tile of claim 1, wherein a number of the plurality of openings are selected to increase sound-absorbing properties of the structure.

6. The acoustic tile of claim 1, wherein thickness of the at least one layer and a number of openings are proportional to one another.

7. The acoustic tile of claim 6, wherein the thickness of the at least one layer increases as the number of openings decreases.

8. The acoustic tile of claim 6, wherein the thickness of the at least one layer decreases as the number of openings increases.

9. The acoustic tile of claim 1, further comprising at least two layers, wherein a plurality of the openings on the first layer are juxtaposed relative to a plurality of the openings on the second layer.

10. The acoustic tile of claim 9, wherein the plurality of the openings on the first layer are a different size than the plurality of the openings on the second layer.

11. The acoustic tile of claim 1, wherein number, size, and/or shape of the plurality of openings is based on a material of manufacture of the structure.

12. The acoustic tile of claim 1, wherein the number, size, and/or shape of the plurality of openings is based on the desired sound-absorbing properties of the structure.

13. The acoustic tile of claim 1, wherein the plurality of openings are various shaped ovals.

14. The acoustic tile of claim 1, wherein at least some of the openings formed between a top surface and a bottom surface of the structure are not perpendicular to the top and bottom surfaces of the structure.

15. The acoustic tile of claim 1, wherein the openings are contorted to direct the sound waves therethrough in multiple different directions through the structure.

16. The acoustic tile of claim 1, wherein the first plurality of openings include a single opening overlapping with a group of openings in the second plurality of openings.

17. The acoustic tile of claim 1, wherein the first plurality of openings include a single opening overlapping with a group of four openings in the second plurality of openings.

18. The acoustic tile of claim 1, wherein only some of the second plurality of openings in the second layer overlap with the first plurality of openings in the first layer, and others of the second plurality of openings are blocked by the first layer.

19. An acoustic tile, comprising:
a structure with at least one layer; and
a plurality of openings formed in the at least one layer of the structure, the openings configured to direct sound waves hitting the structure in multiple different directions through the at least one layer to absorb a majority of the sound waves and inhibit the sound waves hitting the structure from reflecting off of the structure;
wherein a thickness of the at least one layer increases as a number of the plurality of openings decreases.

* * * * *